United States Patent
Tian et al.

(10) Patent No.: US 12,034,368 B1
(45) Date of Patent: Jul. 9, 2024

(54) IMAGE SENSORS WITH IMPROVED NEGATIVE PUMP VOLTAGE SETTLING, AND CIRCUITRY FOR THE SAME

(71) Applicant: OMNIVISION TECHNOLOGIES, INC., Santa Clara, CA (US)

(72) Inventors: Zhenfu Tian, San Jose, CA (US); Dong Yang, Milpitas, CA (US); Zheng Yang, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 18/174,442

(22) Filed: Feb. 24, 2023

(51) Int. Cl.
*H02M 3/07* (2006.01)
*G05F 1/46* (2006.01)
*G05F 3/20* (2006.01)
*H02M 1/00* (2006.01)

(52) U.S. Cl.
CPC ............ *H02M 3/071* (2021.05); *G05F 1/465* (2013.01); *G05F 3/205* (2013.01); *H02M 1/0045* (2021.05)

(58) Field of Classification Search
None
See application file for complete search history.

(56) References Cited

U.S. PATENT DOCUMENTS

| | | | |
|---|---|---|---|
| 6,373,749 B1* | 4/2002 | Atsumi | G11C 16/16 365/185.23 |
| 7,773,432 B2* | 8/2010 | Byeon | G11C 7/08 365/189.11 |
| 8,698,556 B2* | 4/2014 | Rosca | H03F 3/45968 330/9 |
| 9,093,038 B2* | 7/2015 | Han | G09G 3/3614 |
| 9,755,588 B2* | 9/2017 | Matsuoka | H03F 3/45183 |
| 10,694,133 B2* | 6/2020 | Goto | H04N 25/709 |
| 10,854,609 B2* | 12/2020 | Tanabe | H01L 27/0928 |
| 11,252,346 B1 | 2/2022 | Dai et al. | |
| 11,451,224 B2* | 9/2022 | Tao | H03K 17/567 |

FOREIGN PATENT DOCUMENTS

JP 2001275341 A * 10/2001

* cited by examiner

*Primary Examiner* — Thomas J. Hiltunen
(74) *Attorney, Agent, or Firm* — Perkins Coie LLP

(57) ABSTRACT

Image sensors with improved negative pump voltage settling, and circuitry for the same, are disclosed herein. In one embodiment, a power supply settling circuit includes a negative charge pump and a reference voltage generator. An output of the negative charge pump is selectively coupled to a first node of the negative pump settling circuit via a first switch, and an output of the reference voltage generator is selectively coupled to a second node of the negative pump settling circuit via a second switch. The first node is further selectively coupled to ground via a third switch, and the second node is further selectively coupled to ground via a fourth switch. The first node can additionally be coupled to a first pad, and the second node can additionally be coupled to a second pad. The pads can each be coupled to a capacitor, such as an off-chip capacitor.

34 Claims, 5 Drawing Sheets

IMAGE SENSORS WITH IMPROVED NEGATIVE PUMP VOLTAGE SETTLING, AND CIRCUITRY FOR THE SAME

TECHNICAL FIELD

This disclosure relates generally to image sensors. For example, several embodiments of the present technology relate to CMOS image sensors with improved negative pump voltage settling, and circuitry for the same.

BACKGROUND

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present technology are described below with reference to the following figures, in which like or similar reference characters are used to refer to like or similar components throughout unless otherwise specified.

Figure 1:
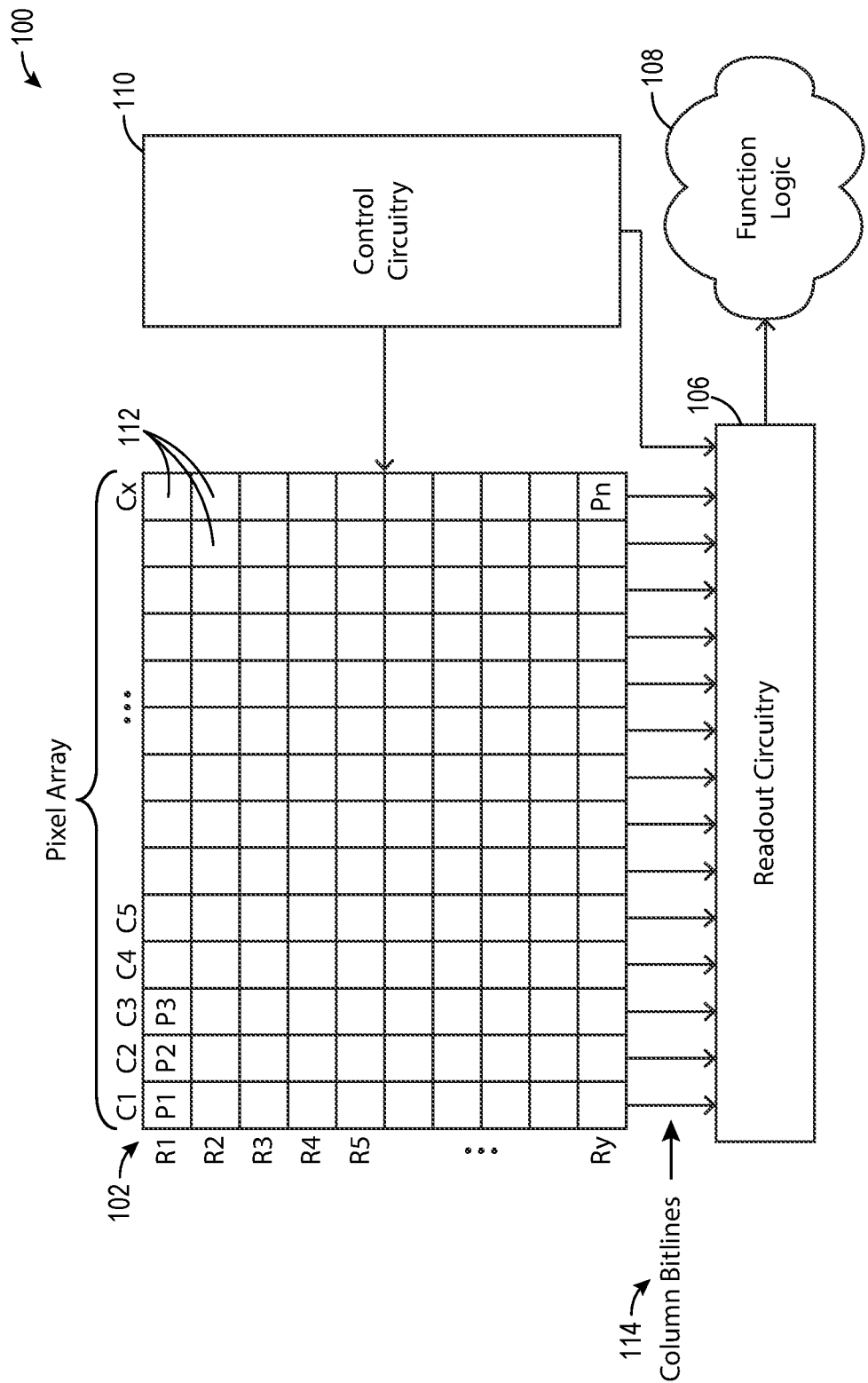
FIG. 1 is a partially schematic block diagram of an image sensor configured in accordance with various embodiments of the present technology.

Skilled artisans will appreciate that elements in the figures are illustrated for simplicity and clarity and are not necessarily drawn to scale. For example, the dimensions of some of the elements in the figures may be exaggerated relative to other elements to aid in understanding of various aspects of the present technology. In addition, common but well-understood elements or methods that are useful or necessary in a commercially feasible embodiment are often not depicted in the figures or described in detail below to avoid unnecessarily obscuring the description of various aspects of the present technology.

DETAILED DESCRIPTION

This disclosure relates generally to image sensors. For example, several embodiments of the present technology relate to CMOS image sensors with improved negative pump voltage settling, and circuitry for the same. In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below," "over," "under," "above," "upper," "top," "bottom," "left," "right," "center," "middle," and the like) may be used herein for ease of description to describe one element's or feature's relationship relative to one or more other elements or features as illustrated in the figures. It will be understood that the spatially relative terms are intended to encompass different orientations of a device or system in use or operation, in addition to the orientation depicted in the figures. For example, if a device or system illustrated in the figures is rotated, turned, or flipped about a horizontal axis, elements or features described as "below" or "beneath" or "under" one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) that illustrated in the figures, and the spatially relative descriptors used herein are interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

A. OVERVIEW

Many CMOS image sensors enter a sleep mode or state to conserve power when the image sensors are not in use. When these CMOS image sensors are subsequently awoken from the sleep mode to a normal working mode or state, voltages produced by the power supplies of these image sensors take time to settle to the appropriate voltage levels. In one specific example, a power supply of a CMOS image sensor can include a negative charge pump, a capacitor, and pad electrically positioned between—and coupled in series with—the negative charge pump and the capacitor. The capacitor can further be coupled to a positive voltage (e.g., VPOS) or another voltage. When the CMOS image sensor is in a sleep mode, a negative pump voltage NVDD at the pad can be at a first value (e.g., 0V). As the CMOS image sensor is transitioned to the normal working mode, the negative pump voltage NVDD at the pad can transition to a second value (e.g., −1.4V). But the transition of the negative pump voltage NVDD from first value to the second value is not instantaneous, meaning that there is an amount of time between when the CMOS image sensor is awoken from the sleep mode and when the negative pump voltage NVDD reaches or settles at the second value. This amount of time is referred to herein as 'NVDD settling time' and can be on the order of 2 ms in some image sensors. Any frames of image data captured during the period of time before the negative pump voltage NVDD settles at the second value could inaccurately represent an external scene being imaged. This can be problematic, especially when attempting to capture an image as quickly as possible after awaking an image sensor from the sleep mode (e.g., to accurately capture an image corresponding to the moment a first firework blooms in a night sky).

To address these concerns, several embodiments of the present technology are directed to image sensors with power supply settling circuits that are employed to reduce or minimize NVDD settling times. For example, several embodiments of the present technology are directed to negative pump settling circuits, each having a negative charge pump and a reference voltage generator. An output of the negative charge pump is selectively coupled to a first node of the negative pump settling circuits via a first switch, and an output of the reference voltage generator is selectively coupled to a second node of the negative pump settling circuits via a second switch. The first node is further selectively coupled to ground via a third switch, and the second node is further selectively coupled to ground via a fourth switch. The first node can additionally be coupled to a first pad (e.g., a negative pump voltage NVDD pad), and the second node can additionally be coupled to a second pad (e.g., a positive voltage VPOS pad). The pads can each be coupled to a capacitor, such as an off-chip capacitor.

In a first operating state of the negative pump settling circuits (e.g., corresponding to a sleep mode of operation of the corresponding power supplies and/or imaging systems employing the negative pump settling circuits), the second node can be coupled to the output of the reference voltage generator via the second switch while the first node can be coupled to ground via the third switch. In addition, the first node can be decoupled from the output of the negative charge pump via the third switch, and the second node can be decoupled from ground via the fourth switch. In this manner, the voltage at the second node can rise to a reference voltage output from the reference voltage generator while the first node is grounded (e.g., at 0V). As such, a precharged gap between the voltage at the second node and the voltage at the first node exists or is established while the negative pump settling circuits are in the first operating state.

When the negative pump settling circuits are subsequently transitioned from the first operating state to a second operating state (e.g., corresponding to a normal working mode of operation of the corresponding power supplies and/or imaging systems employing the negative pump settling circuits), the first node can be decoupled from ground via the third switch and coupled to the output of the negative charge pump via the first switch, and the second node can be decoupled from the output of the reference voltage generator via the second switch and coupled to ground via the fourth switch. As the negative pump settling circuits transition to the second operating state, a negative boost can occur at the first and second nodes to rapidly drop the voltages at each of the nodes by an amount equivalent to the precharged gap established in the first operating state. Thus, in embodiments in which ground is equivalent to 0V, the voltage at the first node can be quickly dropped to the negative equivalent of the reference voltage output from the reference voltage generator. The voltage at the first node can thereafter either settle at the negative equivalent of the reference voltage or proceed to settle at another voltage value.

In this manner, the present technology leverages the negative boost that occurs at the first and second nodes to significantly reduce or minimize NVDD settling times. For example, in many cases, power supply settling circuits of the present technology can facilitate realizing NVDD settling times on the order of approximately 170 µs, representing an NVDD settling time that is approximately ten times faster than NVDD settling times of the other power supplies or imagers discussed above. As such, the present technology facilitates capturing accurate images of an external scene more quickly when an imaging system and/or a corresponding power supply transition from a first operating state (e.g., a sleep mode) to a second operating state (e.g., a normal working mode).

B. SELECTED EMBODIMENTS OF IMAGE SENSORS WITH IMPROVED NEGATIVE PUMP VOLTAGE SETTLING, AND CIRCUITRY FOR THE SAME

FIG. 1 is a partially schematic block diagram of an image sensor 100 configured in accordance with various embodiments of the present technology. As shown, the image sensor 100 includes a pixel array 102, readout circuitry 106, function logic 108, and control circuitry 110. The pixel array can be a two-dimensional (2D) array of pixel cells 112 (identified individually in FIG. 1 as pixel P1 through pixel Pn) that are arranged in rows (identified individually in FIG. 1 as row R1 through row Ry) and columns (identified individually in FIG. 1 as column C1 to column Cx). The pixel cells 112 are each configured to acquire image charge in response to incident light received from an external scene, and to generate a corresponding analog image charge data signal based at least in part on the acquired image charge.

After each pixel cell 112 has acquired image charge, the corresponding analog image charge data signals are read out of the pixel array 102 along column bitlines 114 and into the readout circuitry 106. In some embodiments, the analog image charge data signals are read out from the pixel array 102 one row of pixel cells 112 at a time. Alternatively, the analog image charge data signals are read out from the pixel array 102 using other suitable techniques, such as (a) using a serial read out technique to read out the pixel cells 112 one-by-one in sequence or (b) using a parallel read out technique to read out all or a subset (e.g., multiple rows) of the pixel cells 112 simultaneously.

When the analog image charge data signals are read into the readout circuitry 106, the analog image charge data signals can be converted into digital values (digital representations) using an analog-to-digital converter (ADC)—not shown in FIG. 1. In some embodiments, the ADC of the readout circuitry 106 has adjustable gain such that the analog image charge data signals can be read out of the pixel array 102 with multiple gain settings. Although not shown in FIG. 1, the readout circuitry 106 can additionally, or alternatively, include amplification circuitry, column readout circuitry, and/or other circuitry.

The digital representations of the analog image charge data signals may then be transferred from the readout circuitry 106 to the function logic 108. In some embodiments, the function logic 108 is configured to simply store the digital representations as image data. In other embodiments, the function logic 108 can be configured to manipulate the image data (e.g., by applying post image effects, such as crop, rotate, red eye removal, brightness adjustment, contrast adjustment, etc.) in addition to storing the image data. The image data can be used to render an image of the external scene (e.g., of a person, place, object, etc. within the external scene) from which the light incident on the pixel cells 112 of the pixel array 102 was received.

As shown, the control circuitry 110 is coupled to the pixel array 102. In some embodiments, the control circuitry 110 controls operational characteristics of the pixel array 102. For example, the control circuitry 110 can generate transfer signals and/or other control signals (e.g., reset signals) that are used (a) to control transfer of image charge and/or other signals within each of the pixel cells 112 and/or (b) to control readout of analog image charge data signals from the pixel array 102. As another example, the control circuitry 110 can generate a shutter signal for controlling image acquisition. The shutter signal can be a global shutter signal for enabling all of the pixel cells 112 of the pixel array 102 to simultaneously capture respective image charge (and a corresponding analog image charge data signal) during a single acquisition window. Alternatively, the shutter signal can be a rolling shutter signal such that each row, column, or other grouping of pixel cells 112 is sequentially enabled to capture respective image charge (and corresponding analog image charge data signals) during consecutive acquisition windows. In some embodiments, the shutter signal can establish an exposure time (e.g., defined as a length of time that a shutter remains open, although the image sensor 100 may lack a physical shutter). The exposure time can be the same for each image frame, or the exposure time can vary across different image frames.

In some embodiments, the image sensor 100 can be included in a digital camera, cell phone, laptop computer, or the like. Additionally, or alternatively, image sensor 100 can be coupled to other pieces of hardware, such as a processor (general purpose or otherwise), a memory element, an output (a USB port, a wireless transmitter, an HDMI port, etc.), a lighting/flash, an electrical input (a keyboard, a touch display, a track pad, a mouse, a microphone, etc.), and/or a display. Other pieces of hardware may deliver instructions to the image sensor 100, extract image data from image sensor 100, or manipulate image data supplied by image sensor 100.

Figure 2:
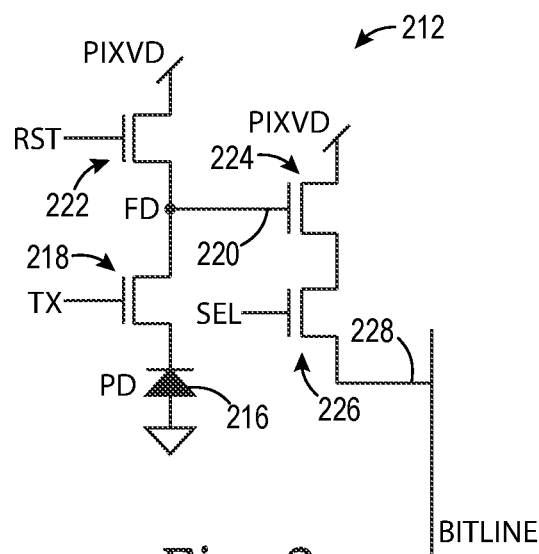
FIG. 2 is a circuit diagram of a pixel cell configured in accordance with various embodiments of the present technology.

FIG. 2 is a circuit diagram of a pixel cell 212 configured in accordance with various embodiments of the present technology. The pixel 212 can be a pixel 112 of the pixel array 102 of FIG. 1, or another pixel of the present technology. As shown, the pixel 212 includes a photosensor 216, a transfer transistor 218, a floating diffusion 220, a reset transistor 222, a source follower transistor 224, and a row select transistor 226. In the illustrated embodiment, the photosensor 216 is a photodiode having an anode coupled to ground (e.g., a negative power supply rail or another reference voltage) and a cathode coupled to the transfer transistor 218. In other embodiments of the present technology, the photosensor 216 may be another suitable type of photosensor or photodetector (e.g., a metal-semiconductor-metal (MSM) photodetector, a phototransistor, a photoconductive detector, or a phototube). In operation, the photosensor 216 is configured to photogenerate image charge or photocurrent in response to incident light received from an external scene.

The transfer transistor 218 selectively couples the photosensor 216 to the floating diffusion 220. In particular, the transfer transistor 218 includes a gate configured to receive a transfer signal TX. When the transfer signal TX applied to the gate of the transfer transistor 218 is asserted, the transfer transistor 218 is activated to transfer photogenerated image charge from the photosensor 216 to the floating diffusion 220.

The reset transistor 222 selectively couples the floating diffusion 220 to a pixel voltage supply. More specifically, the reset transistor 222 includes a gate configured to receive a reset signal RST. When the reset signal RST is asserted, the reset transistor 222 is activated to couple the floating diffusion 220 to the pixel voltage supply, thereby resetting the voltage at the floating diffusion 220.

The floating diffusion 220 is further coupled to a gate of the source follower transistor 224. In operation, the source follower transistor 224 is configured to convert charge at the floating diffusion 220 to an analog signal at the source of the source follower transistor 224.

The row select transistor 226 selectively couples the source of the source follower transistor 224 to a column bitline (e.g., one of the column bitlines 114 of FIG. 1). More specifically, the row select transistor 226 includes a gate configured to receive a row select signal SEL. As the row select signal SEL is asserted, the row select transistor 226 is activated to pass analog signals received from the source follower transistor 224 to the column bitline via a pixel level connection 228.

In an imaging system that utilizes correlated double sampling (CDS), the imaging system uses the pixel 212 to obtain a reset level and a signal level. In particular, after the floating diffusion 220 is reset by asserting the reset signal RST, the imaging system reads out charge at the floating diffusion 220 through the pixel level connection 228 to obtain a corresponding reset level. In addition, after the photosensor 216 photogenerates image charge and the image charge is transferred to the floating diffusion 220 via the transfer transistor 218, the imaging system reads out image charge at the floating diffusion 220 through the pixel level connection 228 to obtain a signal level. Thereafter, the imaging system obtains an image data signal by subtracting the reset level from the signal level to cancel out noise read out in the signal level.

Figure 3:
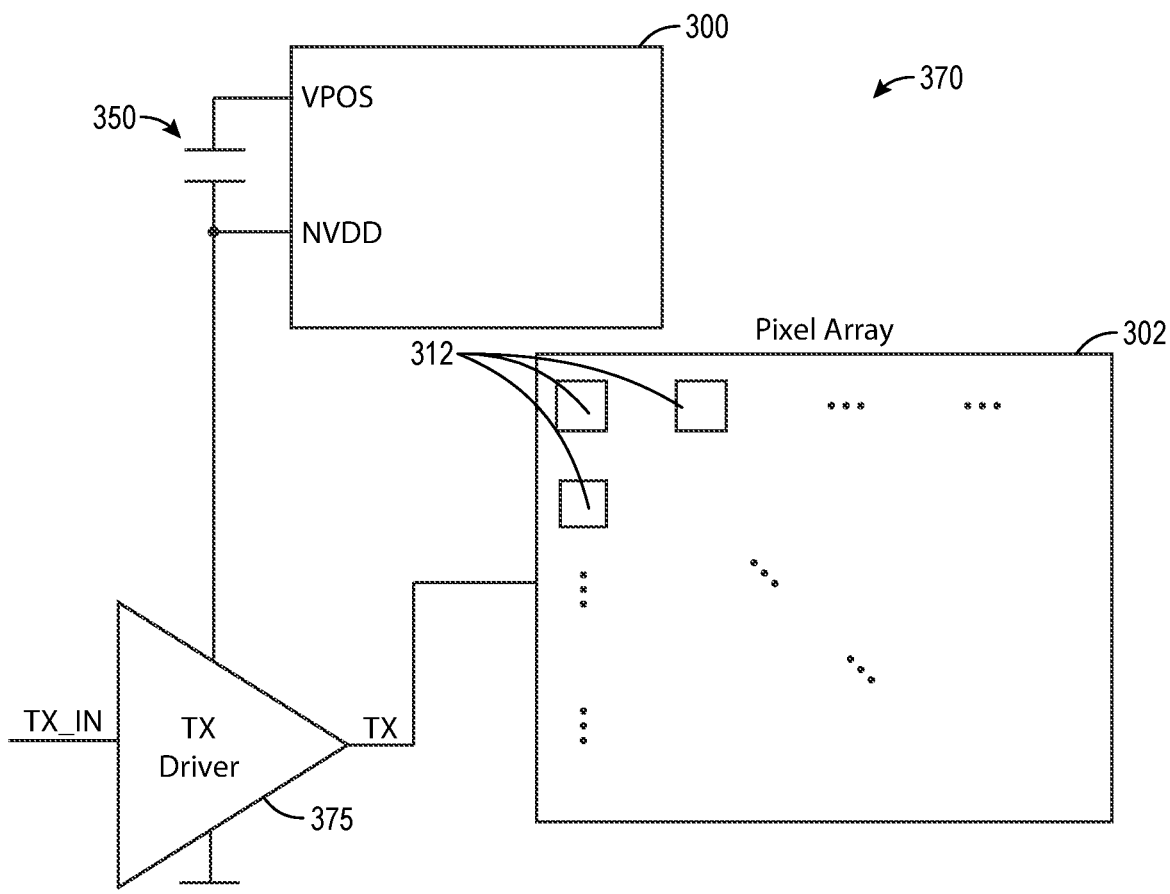
FIG. 3 is a partially schematic block diagram of an imaging system configured in accordance with various embodiments of the present technology.

FIG. 3 is a partially schematic block diagram of an imaging system 370 configured in accordance with various embodiments of the present technology. As shown, the imaging system 370 includes a power supply 300, a transfer gate (TX) driver 375, and an array 302 of pixels 312. In some embodiments, the array 302 can be the pixel array 102 of FIG. 1 or another array of the present technology. In these and other embodiments, the pixels 312 can be the pixels 112 of FIG. 1, implementations of the pixel 212 of FIG. 2, or other pixels of the present technology. In these and still other embodiments, the imaging system 370 can include additional components than shown in the illustrated embodiment. For example, the imaging system 370 can include readout circuitry (e.g., similar to the readout circuitry 106 of FIG. 1) configured to read out signals from the pixels 312 of the array 302 via column bitlines (e.g., similar to column bitlines 114) and/or function logic (e.g., similar to the function logic 108 of FIG. 1). As a specific example, the imaging system 370 can incorporate all or a subset of the image sensor 100 of FIG. 1.

In the illustrated embodiment, the TX driver 375 is coupled to the array 302. More specifically, the TX driver 375 includes (a) an input configured to receive an input signal TX_IN and (b) an output coupled to pixels 312 of the array 302. The input signal TX_IN can be a digital signal. Based at least in part on the input signal TX_IN, the TX driver 375 can generate a transfer signal TX at the output. The output of the TX driver 375 can be coupled to gates of transfer transistors of the pixels 312 of the array 302. Thus, the transfer signal TX generated at the output of the TX driver 375 can be applied to the gates of the transfer transistors of the pixels 312 (e.g., similar to how the transfer transistor 218 of the pixel 212 of FIG. 2 is configured receive the transfer signal TX). Changes in the transfer signal TX can therefore be used to control timing of when a pixel 312 of the array 302 transfers image charge from its photosensor (not shown) to its floating diffusion (not shown), as discussed above with reference to FIG. 2. For example, a pixel 312 of the array 302 can be configured to transfer image charge from its photosensor to its floating diffusion at the rising edge or falling edge of the transfer signal TX. In some embodiments, the TX driver 375 can be part of control circuitry (e.g., the control circuitry 110 of FIG. 1) of the imaging system 370.

In some embodiments, the imaging system 370 includes one or more load capacitances 350. For example, the one or more load capacitances 350 can include an external capacitance that includes design and/or parasitic capacitance. As a specific example, the load capacitance 350 can correspond at least in part to an off-chip capacitor. Additionally, or alternatively, the load capacitances 350 can be associated with a capacitance of the TX driver 375 and/or with an internal capacitance of the power supply 300. In some embodiments, such load capacitances can result at least in part from interactions between metal traces in the imaging system 370.

The TX driver 375 of FIG. 3 is powered by the power supply 300. More specifically, the TX driver 375 is powered by a negative pump voltage NVDD at an output of the power supply 300. Although shown as powering the TX driver 375 in the embodiment illustrated in FIG. 3, the negative pump voltage NVDD generated by the power supply 300 can be used to additionally, or alternatively, power other components of the imaging system 370.

In some embodiments, the imaging system 370 can be placed in a first state or sleep mode (e.g., to conserve power when the imaging system 370 is not in use). When the imaging system 370 is in the first state or sleep mode, the negative pump voltage NVDD provided to the TX driver 375 from the power supply 300 can be at a first value (e.g., 0V). As the imaging system 370 is transitioned to a second state or normal working mode, the negative pump voltage NVDD provided to the TX driver 375 can transition to a second value (e.g., −1.4V). But, as discussed above, the transition of the negative pump voltage NVDD from first value to the second value is not instantaneous, meaning that there is an NVDD settling time representing the amount of time between when the imaging system 370 is awoken from the sleep mode and when the negative pump voltage NVDD reaches or settles at the second value. Any frames of image data captured during the NVDD settling time and before the negative pump voltage NVDD settles at the second value could inaccurately represent an external scene being imaged. For example, the TX driver 375 of the imaging system 370 can be improperly powered during the NVDD settling time. As a result, the transfer signal TX generated at the output of the TX driver 375 may be at a wrong voltage level to properly capture frames of image data during the NVDD settling time. Thus, for frames of image data captured during the NVDD settling time, transfer transistors of at least some of the pixels 312 of the array 302 may not be activated to transfer image charge generated by the photosensors of those pixels 312 to the corresponding floating diffusion regions of those pixels 312. In turn, signal levels read out from those pixels 312 for the frames captured during the NVDD settling time can inaccurately represent light from the external scene that was incident on the photosensors for those frames, meaning that image data signals corresponding to those signal levels can be darker than they otherwise would be had they been generated and read out in frames of image data captured outside of the NVDD settling time. This can be especially problematic when attempting to capture an image as quickly as possible after awaking the imaging system 370 from the sleep mode. As such, reducing the NVDD settling time can facilitate capturing accurate images of an external scene more quickly after the imaging system 370 transitions from the sleep mode to the normal working mode. Therefore, the imaging system 370 and other image sensors/imaging systems configured in accordance with the present technology can employ power supply settling circuits to reduce or minimize NVDD settling time. For example, the power supply 300 can internally employ a power supply settling circuit. Additionally, or alternative, the imaging system 370 can employ a power supply settling circuit that is positioned at least partially external to the power supply 300.

Figure 4:
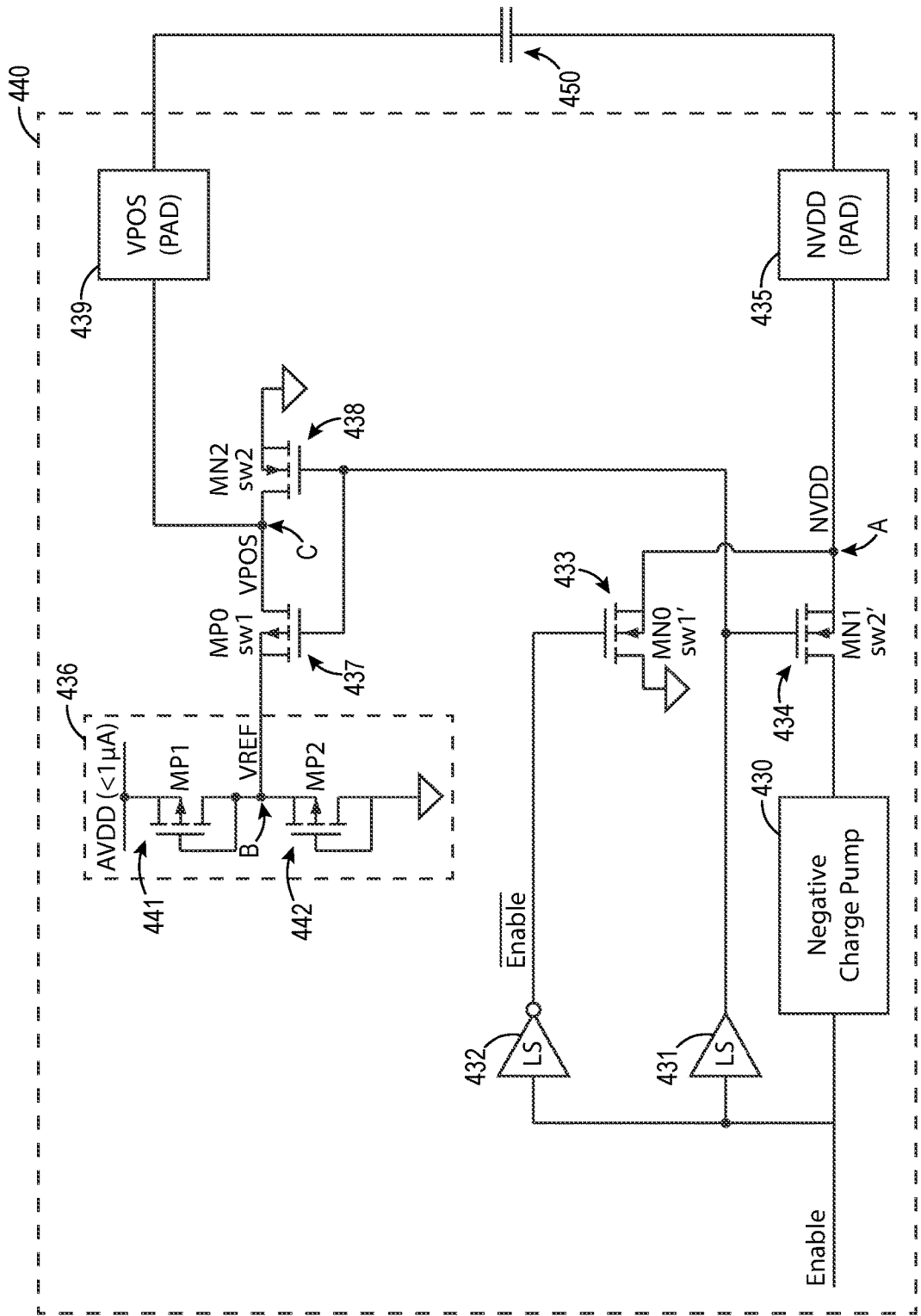
FIG. 4 is a circuit diagram of a power supply settling circuit configured in accordance with various embodiments of the present technology.

FIG. 4 is a circuit diagram of a power supply settling circuit 440 configured in accordance with various embodiments of the present technology. As shown, the power supply settling circuit 440 includes a negative charge pump 430, a level shifter 431, an inverting level shifter 432, a first NMOS transistor 433, a second NMOS transistor 434, a first pad 435, a reference voltage generator 436, a first PMOS transistor 437, a third NMOS transistor 438, and a second pad 439. The power supply settling circuit 440 is also referred to herein as a negative pump settling circuit.

The negative charge pump 430, the level shifter 431, and the inverting level shifter 432 each include an input configured to receive an enable signal Enable. The negative charge pump 430 includes an output selectively coupled to a first node A via the second NMOS transistor 434. A source of the second NMOS transistor 434 is coupled to the first node A, a drain of the second NMOS transistor 434 is coupled to the output of the negative charge pump 430, and a gate of the second NMOS transistor 434 is coupled to an output of the level shifter 431. The output of the level shifter 431 is further coupled to a gate of the first PMOS transistor 437 and a gate of the third NMOS transistor 438. The inverting level shifter includes an output coupled to a gate of the first NMOS transistor 433. A drain of the first NMOS transistor 433 is coupled to the first node A, and a source of the first NMOS transistor 433 is coupled to ground. The first pad 435 is coupled to the first node A.

The reference voltage generator 436 is configured to produce a reference voltage VREF at a second node B of the power supply settling circuit 440. As discussed in greater detail below, the reference voltage VREF can be equivalent to the absolute value of a voltage output from the negative charge pump 430 or another value. In some embodiments, the reference voltage generator 436 can employ a voltage divider to generate the reference voltage VREF. For example, the reference voltage generator 436 can include a voltage divider formed by a second PMOS transistor 441 and a third PMOS transistor 442. The second PMOS transistor 441 can be a diode connected PMOS transistor having (a) a source coupled to an analog power supply voltage AVDD and (b) a gate and a drain shorted together and coupled to the second node B. The third PMOS transistor 442 can similarly be a diode connected PMOS transistor having (a) a source coupled to the second node B and (b) a gate and a drain shorted together and coupled to ground.

A drain of the first PMOS transistor 437 is coupled to the second node C, and a source of the first PMOS transistor 437 is coupled to a third node C of the power supply settling circuit 440. A source of the third NMOS transistor 438 is coupled to ground, and a drain of the third NMOS transistor 438 is coupled to the third node C. The second pad 439 is coupled to the third node C.

The first pad 435 and the second pad 439 can each be coupled to an off-chip capacitor 450. The off-chip capacitor 450 can include a capacitance on the order of approximately 1 µF-2 µF in one example. In some embodiments, the off-chip capacitor 450 illustrated in FIG. 4 can additionally, or alternatively, include or represent a load capacitance corresponding at least in part to the internal capacitance of the power supply (e.g., the power supply 300 of FIG. 3), a TX driver (e.g., the TX driver 375 of FIG. 3), and/or other peripheral/external circuitry.

Figure 5A:
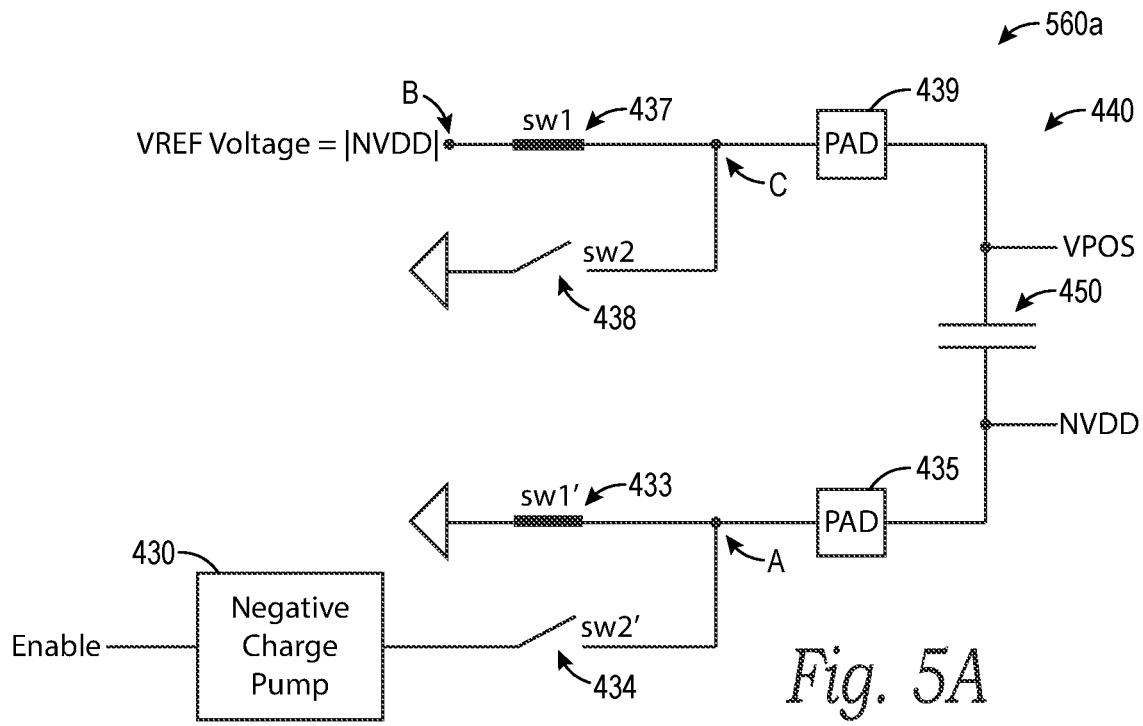
FIG. 5A is a simplified circuit diagram of the power supply settling circuit of FIG. 4 in a state corresponding to a sleep mode of operation, in accordance with various embodiments of the present technology.
Figure 5B:
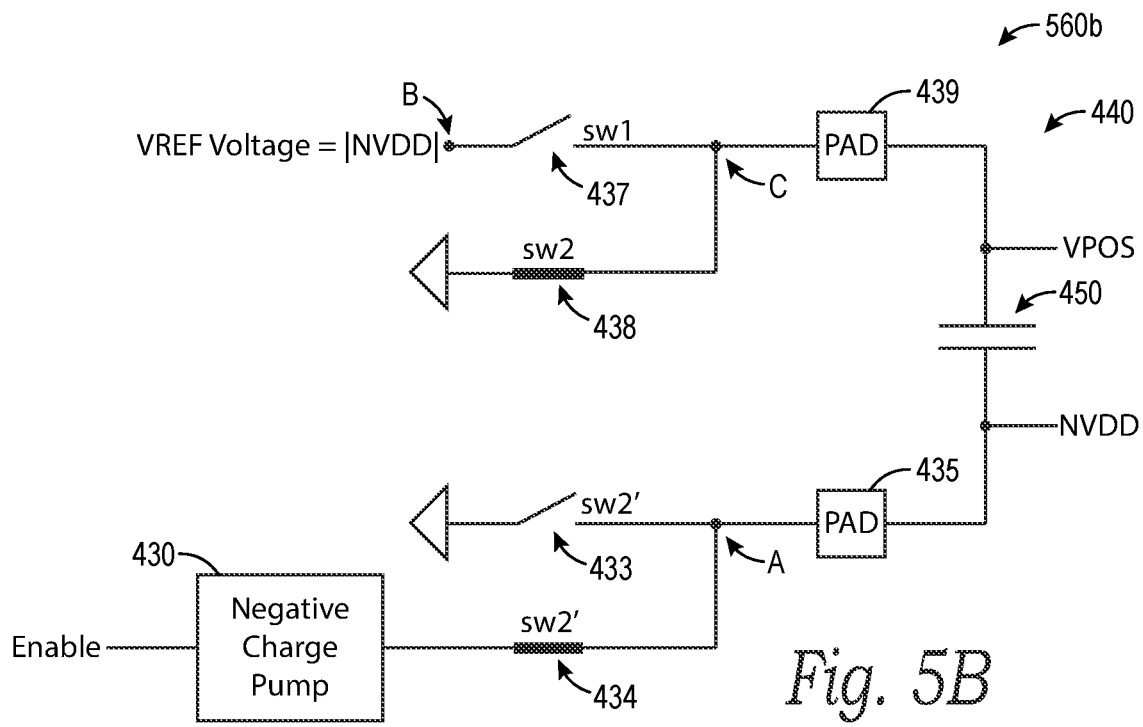
FIG. 5B is a simplified circuit diagram of the power supply settling circuit of FIG. 4 in a state corresponding to a normal working mode of operation, in accordance with various embodiments of the present technology.

FIGS. 5A and 5B are simplified circuit diagrams of the power supply settling circuit 440 of FIG. 4 in different states 560a and 560b, respectively. For example, the state 560a of the power supply settling circuit 440 illustrated in FIG. 5A can correspond to a sleep mode of operation, and the state 560b of the power supply settling circuit 440 illustrated in FIG. 5B can correspond to a normal working mode of operation.

As shown in FIGS. 5A and 5B, the first NMOS transistor 433, the second NMOS transistor 434, the first PMOS transistor 437, and the third NMOS transistor 438 are operated as switches whose states (open/closed or activated/deactivated) depend on the state (asserted/not asserted) of the enable signal Enable. For example, the first NMOS transistor 433 is operated to selectively couple (a) the first node A and the first pad 435 to (b) ground; the second NMOS transistor 434 is operated to selectively couple (a) the first node A and the first pad 435 to (b) the output of the negative charge pump 430; the first PMOS transistor 437 is operated to selectively couple (a) the third node C and the second pad 439 to (b) the second node B (e.g., to the output of the reference voltage generator 436 of FIG. 4); and the third NMOS transistor 438 is operated to selectively couple (a) the third node C and the second pad 439 to (b) ground.

The simplified circuit diagrams of the power supply settling circuit 440 illustrated in FIGS. 5A and 5B will now be discussed with reference to FIG. 6 that illustrates a timing diagram 690 corresponding to transitioning the power supply settling circuit 440 from the sleep mode to the normal working mode. During a period of time between time t0 and time t1 in the timing diagram 690 of FIG. 6, the power supply settling circuit 440 operates in a sleep mode corresponding to the state 560a illustrated in FIG. 5A. More specifically, a sleep enable signal sleep_en is asserted while the enable signal Enable is not asserted. When the enable signal Enable is not asserted, the first NMOS transistor 433 and the first PMOS transistor 437 are activated while the second NMOS transistor 434 and the third NMOS transistor 438 are deactivated. As such, the first node A is coupled to ground via the first NMOS transistor 433 such that a negative pump voltage NVDD at the first pad 435 is equivalent to ground (e.g., 0V). In addition, the third node C is coupled to the second node B via the first PMOS transistor 437 such that a positive voltage VPOS at the second pad 439 is equivalent to the reference voltage VREF output from the reference voltage generator 436 (FIG. 4). In some embodiments, the positive voltage VPOS at the second pad 439 while the power supply settling circuit 440 operates in the sleep mode can be −1.4V.

Figure 6:
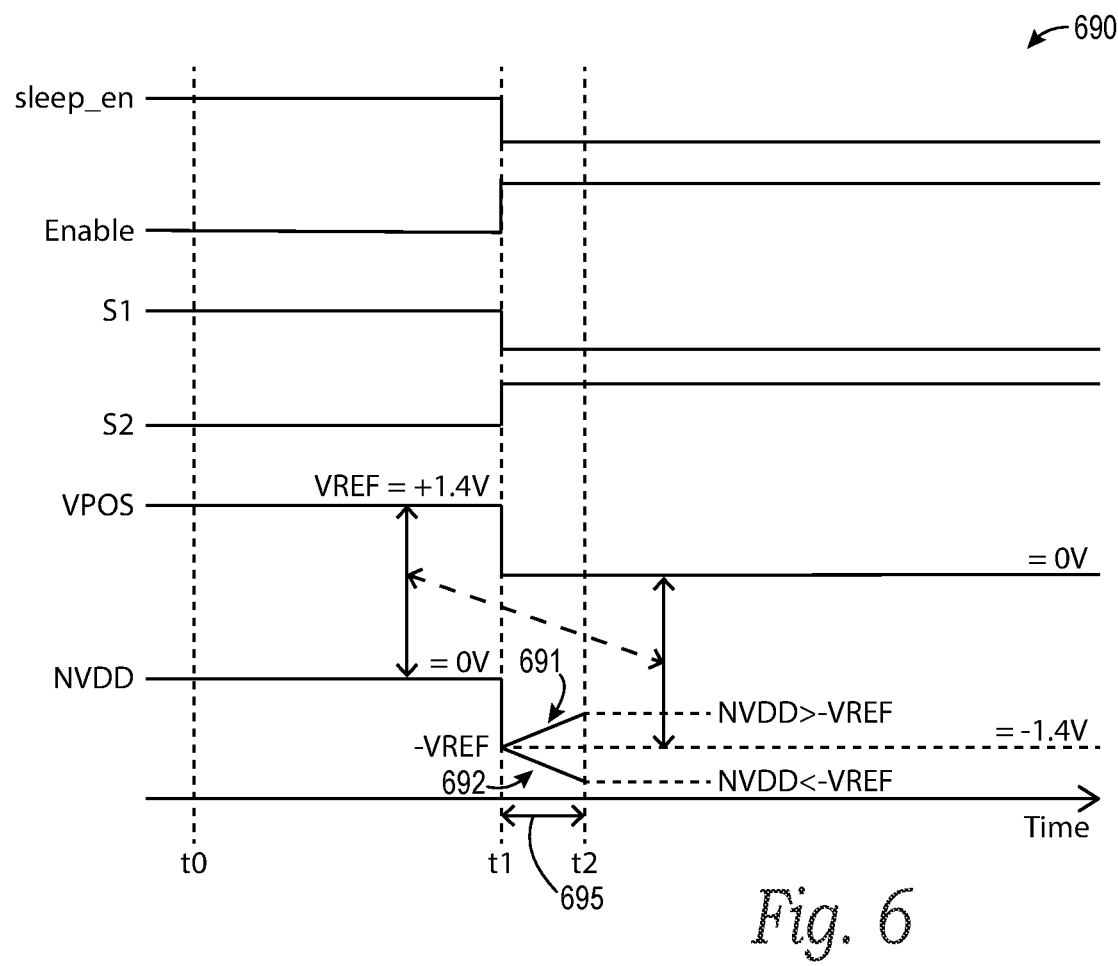
FIG. 6 is a timing diagram corresponding to the power supply settling circuit of FIG. 4 and the simplified circuit diagrams of FIGS. 5A and 5B.

At time t1 in the timing diagram 690 illustrated in FIG. 6, the power supply settling circuit 440 is transitioned from operating in the sleep mode to operating in a normal working mode corresponding to the state 560b illustrated in FIG. 5B. More specifically, the sleep enable signal sleep_en is unasserted while the enable signal Enable is asserted. When the enable signal Enable is asserted, the second NMOS transistor 434 and the third NMOS transistor 438 are activated while the first NMOS transistor 433 and the first PMOS transistor 437 are deactivated. As such, the first node A and the first pad 435 are (a) decoupled from ground and (b) coupled to the output of the negative charge pump 430 via the second NMOS transistor 434. At the same time, the third node C and the second pad 439 are (a) decoupled from the second node B (e.g., the output of the reference voltage generator 436 of FIG. 4) and (b) coupled to ground via the third NMOS transistor 438. Thus, the positive voltage VPOS at the second pad 439 drops from the reference voltage VREF to ground (e.g., 0V) while the negative pump voltage NVDD at the first pad 435 transitions from ground (e.g., 0V) to the negative equivalent of the reference voltage VREF (e.g., −1.4V).

As shown in FIG. 6, the positive voltage VPOS at the second pad 439 and the negative pump voltage NVDD at the first pad 435 experience a negative boost at time t1 equivalent to a precharged gap between the positive voltage VPOS and the negative pump voltage NVDD just prior to time t1. Thus, the NVDD settling time of the power supply settling circuit 440 can be optimized or minimized by setting the reference voltage VREF output from the reference voltage generator 436 (FIG. 4) equivalent to the absolute value of a desired final voltage level at which the negative pump voltage NVDD settles when the power supply settling circuit 440 is transitioned from the sleep mode to the normal working mode. Stated another way, the NVDD settling time of the power supply settling circuit 440 can increase with an increase in the difference between (a) the final voltage level at which the negative pump voltage NVDD settles and (b) the negative equivalent of the reference voltage VREF. To illustrate this point, the timing diagram 690 of FIG. 6 is shown with two line segments 691 and 692 corresponding to the negative pump voltage NVDD. The line segment 691 illustrates the negative pump voltage NVDD initially dropping to the negative equivalent of the reference voltage VREF and then gradually increasing until it settles at time t2 at a final voltage level that is greater than the negative equivalent of the reference voltage VREF. The line segment 692 illustrates the negative pump voltage NVDD initially dropping to the negative equivalent of the reference voltage VREF and then gradually decreasing until it settles at time t2 at a final voltage level that is lesser than the negative equivalent of the reference voltage VREF. In both cases, the NVDD settling time (represented by time t2 minus time t1 in the timing diagram 690) is positively correlated with the magnitude of the difference between the final voltage level at which negative pump voltage NVDD settles and the negative equivalent of the reference voltage VREF. For this reason, the negative boost experienced at or around time t1 in the timing diagram 690 can be maximally leveraged when the reference voltage VREF output from the reference voltage generator 436 of FIG. 4 is equivalent to the absolute value of a desired final voltage level at which the negative pump voltage NVDD settles when transitioning from the sleep mode to the normal working mode.

In many cases, the NVDD settling time of the power supply settling circuit 440 can be much less than the NVDD settling times of other power supplies and/or imagers. For example, the NVDD settling time of the power supply settling circuit 440 can be on the order of approximately 170 μs in some embodiments, representing an NVDD settling time that is approximately ten times faster than other power supplies or imagers that do not employ a power supply settling circuit of the present technology and/or that include NVDD settling times on the order of 2 ms. In this manner, the present technology significantly reduces or minimizes NVDD settling times, thereby facilitating capturing accurate images of an external scene more quickly when an imaging system and/or a corresponding power supply transition from a sleep mode to a normal working mode.

C. CONCLUSION

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A negative pump settling circuit, comprising:
   a negative charge pump;
   a first level shifter;
   a second level shifter different from the first level shifter;
   a first switch selectively coupling an output of the negative charge pump to a first node;
   a second switch selectively coupling the first node to ground;
   a third switch selectively coupling a second node to an output of a reference voltage generator; and
   a fourth switch selectively coupling the second node to ground,
   wherein the first node and the second node are couplable to one another via a capacitor,
   wherein an output of the first level shifter is coupled to the first switch, the third switch, and the fourth switch such that a signal generated at the output of the first level shifter is usable to control each of the first switch, the third switch, and the fourth switch, and
   wherein an output of the second level shifter is coupled to the second switch such that a signal generated at the output of the second level shifter is usable to control the second switch.

2. The negative pump settling circuit of claim 1, wherein the first switch includes an NMOS transistor having a source coupled to the first node and a drain coupled to the output of the negative charge pump.

3. The negative pump settling circuit of claim 2, wherein the NMOS transistor further includes a gate coupled to the output of the first level shifter, and wherein the first level shifter includes an input configured to receive an enable signal.

4. The negative pump settling circuit of claim 1, wherein the second switch includes an NMOS transistor having a source coupled to ground and a drain coupled to the first node.

5. The negative pump settling circuit of claim 4, wherein the NMOS transistor further includes a gate coupled to the output of the second level shifter, and wherein the second level shifter includes an input configured to receive an enable signal.

6. The negative pump settling circuit of claim 1, wherein the third switch includes an PMOS transistor having a source coupled to the reference voltage generator and a drain coupled to the second node.

7. The negative pump settling circuit of claim 6, wherein the PMOS transistor includes a gate coupled to the output of the first level shifter, and wherein the first level shifter includes an input configured to receive an enable signal.

8. The negative pump settling circuit of claim 1, wherein the fourth switch includes an NMOS transistor having a source coupled to ground and a drain coupled to the second node.

9. The negative pump settling circuit of claim 8, wherein the NMOS transistor includes a gate coupled to the output of the first level shifter, and wherein the first level shifter includes an input configured to receive an enable signal.

10. The negative pump settling circuit of claim 1, wherein the first switch and the fourth switch are configured such that (i) the first switch is open when the fourth switch is open and (ii) the first switch is closed when the fourth switch is closed.

11. The negative pump settling circuit of claim 1, wherein the second switch and the third switch are configured such that (i) the second switch is open when the third switch is open and (ii) the second switch is closed when the third switch is closed.

12. The negative pump settling circuit of claim 11, wherein the first switch, the second switch, the third switch, and the fourth switch are configured such that (i) the first switch and the fourth switch are open when the second switch and the third switch are closed and (ii) the first switch and the fourth switch are closed when the second switch and the third switch are open.

13. The negative pump settling circuit of claim 1, wherein the reference voltage generator includes (a) a first PMOS transistor having a source coupled to a power supply voltage AVDD and a drain coupled to the output of the reference voltage generator, and (b) a second PMOS transistor having a source coupled to the output of the reference voltage generator and a drain coupled to ground.

14. The negative pump settling circuit of claim 13, wherein the first PMOS transistor or the second PMOS transistor is a diode connected PMOS transistor having its gate shorted with its drain.

15. The negative pump settling circuit of claim 1, wherein the reference voltage generator is configured to generate a reference voltage at the output of the reference voltage generator, and wherein the reference voltage is equivalent to an absolute value of a voltage level at which a negative pump voltage NVDD at the first node settles after the negative pump settling circuit transitions from a first operating state to a second operating state.

16. The negative pump settling circuit of claim of claim 15, wherein:

the first switch and the fourth switch are configured to be open when the negative pump settling circuit is operated in the first operating state;

the second switch and the third switch are configured to be closed when the negative pump settling circuit is operated in the first operating state;

the first switch and the fourth switch are configured to be closed when the negative pump settling circuit is operated in the second operating state; and the second switch and the third switch are configured to be open when the negative pump settling circuit is operated in the second operating state.

17. The negative pump settling circuit of claim 1, further comprising:

a first pad coupled to the first node; and
a second pad coupled to the second node,
wherein the first pad and the second pad are each couplable to the capacitor.

18. The negative pump settling circuit of claim 1, wherein the capacitor is an off-chip capacitor.

19. The negative pump settling circuit of claim 1, wherein the second level shifter includes an inverting level shifter.

20. A method of operating a negative pump settling circuit, the method comprising:

precharging, while operating the negative pump settling circuit in a first state, a first node of the negative pump settling circuit to a reference voltage to establish a voltage difference between the first node and a second node of the negative pump settling circuit different from the first node; and transitioning the negative pump settling circuit from the first state to a second state such that (a) a negative boost occurs at the second node to drop a voltage at the second node an amount equivalent to the voltage difference and (b) the voltage at the second node settles at a voltage level, wherein transitioning the negative pump settling circuit from the first state to the second state includes— using an output of a first level shifter of the negative pump settling circuit to (a) decouple the first node from an output of a reference voltage generator, (b) couple the first node to ground, and (c) couple the second node to an output of a negative charge pump, and using an output of a second level shifter of the negative pump settling circuit that is different from the first level shifter to decouple the second node from ground, wherein the second node is coupled to the first node at least while transitioning the negative pump settling circuit from the first state to the second state.

21. The method of claim 20, further comprising generating the reference voltage such that the reference voltage is equivalent to an absolute value of the voltage level.

22. The method of claim 20, wherein precharging the first node includes coupling the first node to the output of the reference voltage generator.

23. The method of claim 22, wherein precharging the first node further includes decoupling the first node from ground.

24. The method of claim 22, wherein precharging the first node further includes coupling the second node to ground.

25. The method of claim 24, wherein coupling the second node to ground includes coupling the second node to ground at a same timing as coupling the first node to the output of the reference voltage generator.

26. The method of claim 24, wherein precharging the first node further includes decoupling the second node from the output of the negative charge pump.

27. The method of claim 20, wherein coupling the first node to ground includes coupling the first node to ground at a same timing as coupling the second node to the output of the negative charge pump.

28. The method of claim 20, wherein transitioning the negative pump settling circuit from the first state to the second state includes simultaneously (a) decoupling the first node from the output of the reference voltage generator, (b) coupling the first node to ground, (c) decoupling the second node from ground, and (d) coupling the second node to the output of the negative charge pump.

29. The method of claim 20, further comprising transitioning the negative pump settling circuit from the second state to the first state, wherein transitioning the negative pump settling circuit from the second state to the first state includes simultaneously (a) decoupling the first node from ground, (b) coupling the first node to the output of the reference voltage generator, (c) decoupling the second node from the output of the negative charge pump, and (d) coupling the second node to ground.

30. The method of claim 20, further comprising coupling the first node to the second node via a capacitor.

31. The method of claim 29, wherein transitioning the negative pump settling circuit from the second state to the first state includes— using the output of the first level shifter to (i) decouple the first node from ground, (ii) couple the first node to the output of the reference voltage generator, and (iii) decouple the second node from the output of the negative charge pump; and using the output of the second level shifter to couple the second node to ground.

32. The method of claim 20, further comprising transitioning the negative pump settling circuit from the second state to the first state, wherein transitioning the negative pump settling circuit from the second state to the first state includes (a) decoupling the first node from ground, and (b) coupling the first node to the output of the reference voltage generator.

33. The method of claim 20, further comprising transitioning the negative pump settling circuit from the second state to the first state, wherein transitioning the negative pump settling circuit from the second state to the first state includes (a) decoupling the second node from the output of the negative charge pump, and (b) coupling the second node to ground.

34. The method of claim 20, wherein using the output of the second level shifter to decouple the second node from ground includes using the output of an inverting level shifter to decouple the second node from ground.

* * * * *